United States Patent Office 3,391,332
Patented July 2, 1968

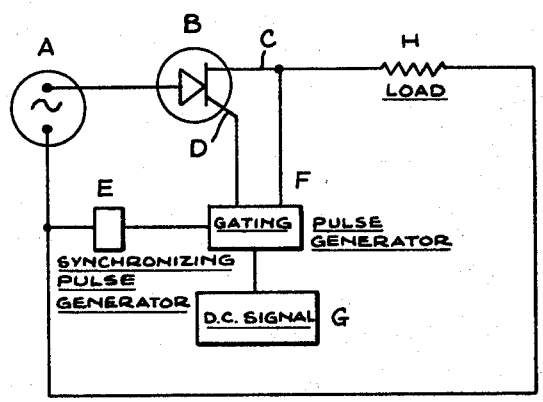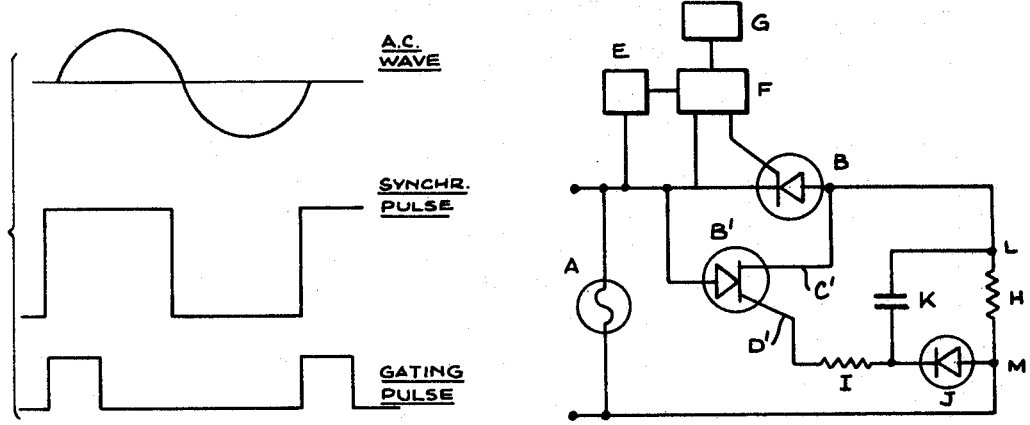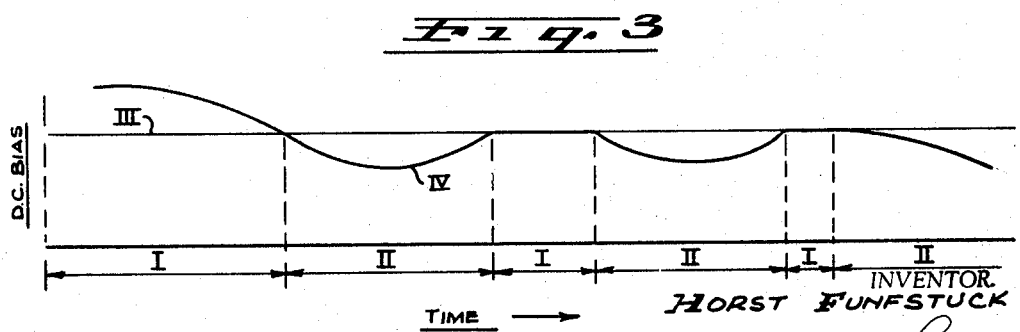

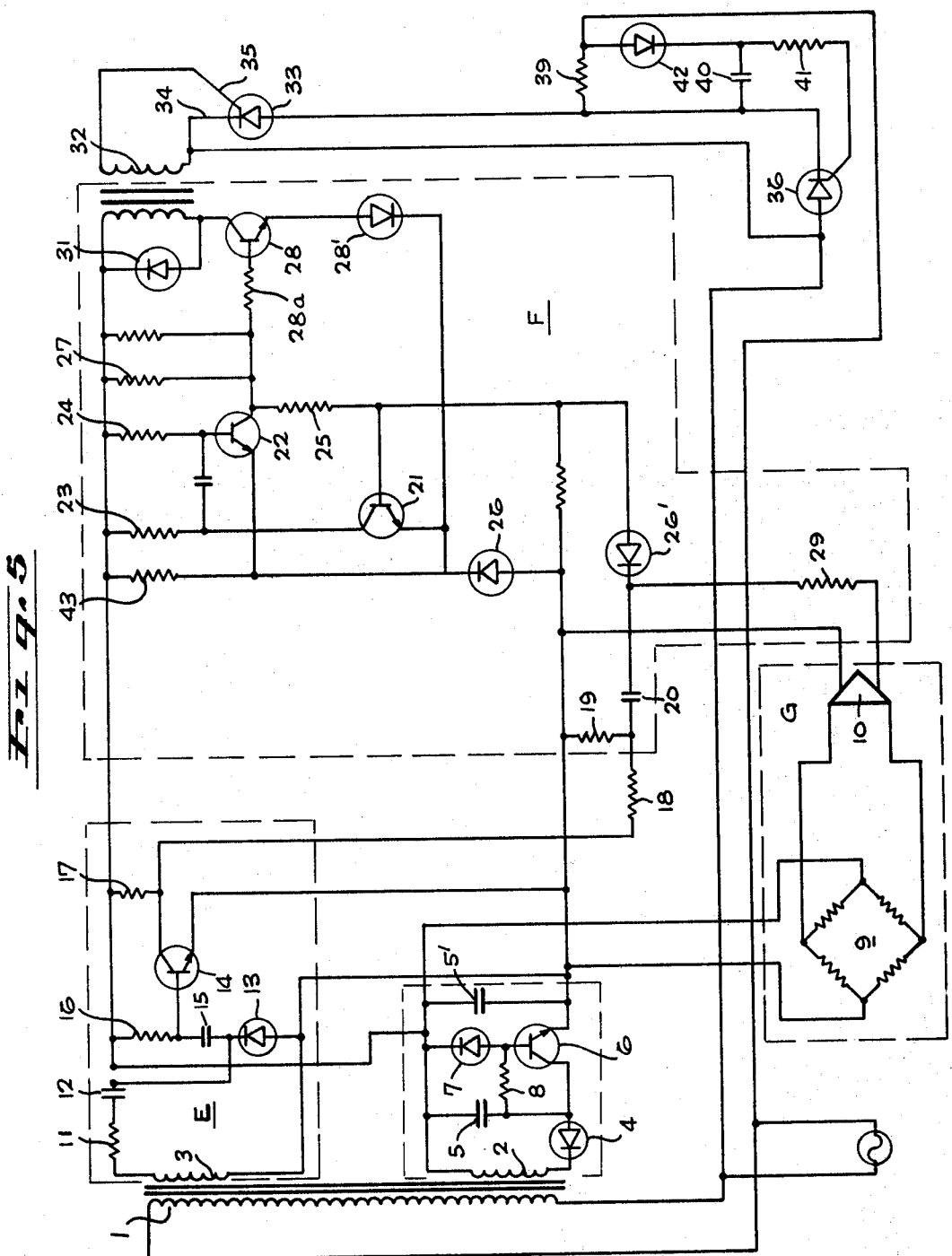

3,391,332
SILICON CONTROLLED RECTIFIER CIRCUITS
AND POWER SUPPLIES
Horst Funfstuck, Los Angeles, Calif., assignor to Statham Instruments, Inc., Los Angeles, Calif., a corporation of California
Filed Nov. 16, 1964, Ser. No. 411,266
4 Claims. (Cl. 323—22)

ABSTRACT OF THE DISCLOSURE

A control circuit for a silicon controlled rectifier or thyratron rectifier, including a pulse generator to bias the rectifier off except when the alternating anode voltage applied thereto acts as a forward bias and is only slightly above zero. Abrupt loading of the power supply is thus avoided because the rectifier is not permitted to fire when the anode voltage is relatively high.

---

This invention relates to power control circuits, and it is particularly adapted for use with silicon controlled rectifiers (SCR) and thyratron rectifiers herein referred to as current controlling devices, in which the fraction of the applied AC regulated by the rectifiers is controlled by controlling the fraction of the total of the positive pulses of the applied AC during which the (SCR) or thyratron is maintained conductive.

In such circuits, if the start of the conductive period of the control element occurs when the AC potential is finite, i.e., not zero, in the presence of a load, the resultant step function of the current applied will cause a generation of high frequency of oscillation. The step function also produces an abrupt loading of the power line resulting in distortions in the power line wave form. Such noise may cause malfunctioning of associated equipment and other interferences.

It is an object of my invention to initiate conductivity of the (SCR) or the thyratron when the applied AC circuit voltage wave crosses zero.

In many circuits it is desired to control the current input of the load responsive to some condition. It is an object of my invention to control the AC current applied to a load by means of a current regulator, for example, an SCR or thyratron, and cause the current regulating device to become conductive (i.e., to fire), when the AC voltage of the AC crosses from negative to positive, and to control the electrical energy supplied to the load, by controlling the duration of the train of positive pulses of the applied AC during which the control device is conductive to pass the current to the load.

I accomplish these objectives by employing a square-wave synchronizing pulse generator, synchronized to the applied AC. The generated pulse bears a phase relationship to the AC wave such that the pulse is timed to lead the positive half of the AC wave. The lead angle may be any angle up to but less than 180°, but preferably is a small angle of only a few degrees. The generated square-wave pulse initiates a train of triggering pulses which are applied to the gate of the SCR or the grid of the thyratron here referred to as the control electrode. The triggering pulse, herein also is referred to as a gating pulse in the case of the SCR, each triggering pulse being of a pulse width less than the pulse width of the applied AC wave and leads the AC wave by an angle which may be any angle less than 180° but preferably an angle of a few degrees. The triggering pulse is generated only when a proper DC bias and the synchronizing pulse are simultaneously applied to the triggering pulse generator.

The synchronizing pulse, in the absence of the DC bias, has a peak potential which is insufficient to activate the triggering pulse generator. The magnitude of the DC bias is made responsive to the energy demand of the load circuit.

The result is that a synchronizing pulse is applied to the triggering pulse generator slightly ahead of the zero point of the AC wave, and for each succeeding cycle so long as the DC bias is of sufficient magnitude, the current control device, for example, is conductive for each positive half of the cycle initiated at the zero potential, and the triggering pulse cuts off when the DC bias falls below a given level. So long as the energy demand is maintained, the biasing DC will cause the triggering pulse to be generated when the synchronizing pulse is applied, and the control device fires at each succeeding positive half of the AC wave as it crosses zero to positive.

This invention will be further described by reference to the drawings of which:

FIG. 1 is a schematic diagram of a control circuit according to my invention;

FIG. 2 is a diagram of the relative pulses effective in the circuit of my invention;

FIG. 3 is an illustrative diagram of the biasing DC signal;

FIG. 4 is a modification of the circuit of FIG. 1; and

FIG. 5 is a circuit diagram showing the application of the control system of my invention in one application.

FIG. 1 illustrates in block diagram form the principle of the control circuit of my invention. B is a gated rectifying means such as an SCR. The cathode and anode of the SCR are connected in series with the input terminals at A. The gating pulse generator is connected between the cathode C and the gate D of the SCR. The synchronizing pulse generator E is coupled to the gating pulse generates a square-wave pulse which leads the AC wave DC signal source G. The synchronizing pulse generator generates a square-wave pulse which leads the AC wave as is illustrated in FIG. 2, by a small angle less than 90°. The synchronizing pulse is synchronized to the AC wave and employs a phase shifting network to delay the square-wave by 180° minus the desired lead angle. The purpose is to assure a substantially stable positive potential of the synchronizing pulse at the gating pulse generator during the period of time that the AC wave crosses from a finite negative value to a finite positive value, to be sure that the SCR fires when the AC wave crosses zero going positive.

The synchronizing pulse causes a generation of a gating pulse at the gating pulse generator, if at that time the DC bias applied by the DC signal generator, acting with the synchronizing pulse is sufficient to activate the gating pulse generator. Such a pulse generator may be a flip flop or multivibrator which will generate a square-wave pulse which is at peak potential as the AC wave moves through zero going positive, and will be at substantially zero potential during the rest of the period of the positive and negative halves of the AC cycle. Thus, for example, and without any limitation of my invention, for a 60 cycle AC, the gating pulse may be of 4 milliseconds' duration and be initiated by the synchronizing pulse about 1 millisecond prior to the time that the AC wave reaches zero going positive.

As stated above, it is a condition for the generation of the gating pulse that there be applied to the flip flop both the synchronizing pulse and a DC bias of sufficient magnitude. Thus, if the DC bias fluctuates as a result of some condition which is related to the load demand, the period of time during which gating pulses are generated, and the SCR is conductive, will be only when the DC signal is at or above the level required to cause the flip flop to generate this gating pulse. This is illustrated in FIG. 2 and FIG. 3. In FIG. 3, I indicates the periods of time that the gating pulse is generated, and II the period of time during which no gating pulses are generated. III is the minimum DC level at which gating pulses are generated, and IV is the trace of the DC signal as a function of time.

FIG. 4 shows an alternative way of connecting two SCR in a master and slave configuration and subject to the controls described in connection with FIGS. 1, 2 and 3. The parts common to FIGS. 1 and 4 are marked with the same letters. The anode of the slave (SCR) B' is connected to the cathode of the master (SCR) B and the cathode C' of the slave (SCR) B' is connected to the anode of the master (SCR) B. The gate D' is coupled to the load H by the resistor I and the diode J, and the condenser K. The (SCR) B' is connected in reverse to that of (SCR) B to allow current flow in the opposite direction. This makes it possible to employ both the negative and the positive half of the AC wave.

When the master (SCR) B is not conductive, no current flows in the circuit through the load. When B is conductive current through the load H makes L negative with respect to M. The capacitor K is charged through the diode J, and the current flows through I to the gate D'. Assuming that K and I are made large enough to maintain a sufficient gate current at D' for a time to maintain a gate potential so as to maintain B' conductive into the negative half cycle, the oppositely connected SCR, i.e., B' will be conductive during the negative half cycle during which B is non-conductive, and B' will be non-conductive during the positive half cycle, and B is conductive.

FIG. 5 illustrates a schematic diagram of one circuit embodying my invention applied to the control of an environmental heater. The transformer 1 steps the line voltage down by means of two isolated secondaries 2 and 3. The voltage at 2 is rectified by the diode 4, filtered by the capacitors 5 and 5', transistor 6 and Zener diode 7 and resistance 8, to produce the DC voltage for the remainder of the circuitry.

The synchronization pulse generator E (see FIGS. 1 and 2) is employed to produce a square wave by clipping and phase shifting the impressed AC voltage to obtain the required pulse for the multivibrator (flip flop), by means of the resistors 11 and the condenser 12 and diode 13. The signal is clipped further and amplified by transistor 14 acting with the capacitor 15 and resistors 16 and 17. The network consisting of resistors 18, 19 and capacitor 20 acts as a coupling and isolating element for the associated circuits. The square wave at the collector of the transistor 14 and its relation to the applied AC wave, is that illustrated in FIG. 2.

The DC signal generator G is a temperature sensitive bridge 9 and a DC amplifier 10. The bridge is excited by the DC source described above. The bridge contains a temperature sensitive element which is responsive to the temperature of the space heated by the heater 39. The DC output is applied through the resistor 29, between the condenser 20 and the diode 26' to the base of transistor 21 of the multivibrator. The DC potential is a function of the temperature produced by the heater 39.

The flip flop F (see FIGS. 1 and 4) which generates the gating pulse (see FIG. 2), reverses, i.e., flips only when the synchronization pulse and the proper DC bias is applied. The multivibrator is formed of the transistors 21 and 22, and the resistances 23, 24, 25 and 27. It is biased by the diode 26 and resistance 43. The output is amplified by the transistor 28 acting with diodes 28' and 31, and resistor 28a and coupled to the SCR 33 by the transformer 32. The amplified voltage is applied to the cathode 34, and the gate 35 of the SCR 33.

The SCR 33 is connected with the SCR 36 in a master and slave configuration such as is illustrated in FIG. 4 as will be evident.

The heater 39 is the load H. The condenser 40 and resistors 41 correspond to K and I, and the diode 42 corresponds to the diode J.

While I have described particular embodiments of my invention for the purpose of illustration, it should be understood that various modifications and adaptations thereof may be made within the spirit of the invention, as set forth in the appended claims.

I claim:

1. A gate control circuit for a gated rectifying means arranged between an AC power source and a load, comprising:

means for generating a train of pulses in synchronism with the AC source power, the leading edges of which pulses occur before the zero-crossing preceding those half-waves of AC power to be applied to the load by the rectifying means, said pulse train generating means including means for providing square-wave pulses, each pulse of which has a width not exceeding a half-wave of the AC source power, and its leading edge precedes the next zero-crossing of the AC power by less than 180 electrical degrees;

a DC signal source of selectively variable magnitude; and gating signal generating means connected to the pulse train generating means and DC signal source for providing a gating signal to the rectifying means upon coincidence of a synchronizing pulse and a DC signal of magnitude exceeding a predetermined value.

2. A gate control circuit for a gated rectifying means arranged between an AC power source and a load, comprising:

means for generating a train of pulses in synchronism with the AC source power, the leading edges of which pulses occur before the zero-crossing preceding those half-waves of AC power to be applied to the load by the rectifying means;

a DC signal source of selectively variable magnitude; and gating signal generating means connected to the pulse train generating means and DC signal source for providing square-wave gating pulses of width less than that of the synchronizing pulses to the rectifying means upon coincidence of a synchronizing pulse and a DC signal of magnitude exceeding a predetermined value.

3. A gate control circuit as in claim 2, in which the gated rectifying means includes first and second gated diodes in shunt with one another and oppositely poled, the first diode being controlled by signals from the gating signal generating means, and there being further provided means for gating the second diode to conduction during those half-waves of AC source power that the first diode is non-conductive.

4. A gate control circuit for a gated rectifying means arranged between an AC power source and a load, comprising:

means for generating a train of pulses in synchronism with the AC source power, the leading edges of which pulses occur before the zero-crossing preceding those half-waves of AC power to be applied to the load by the rectifying means;

a DC signal source of selectively variable magnitude;

a gating signal generating means connected to the pulse train generating means and DC signal source for providing a gating signal to the rectifying means upon coincidence of a synchronizing pulse and a DC signal of magnitude exceeding a predetermined value; and said gated rectifying means includes first and second gated diodes in shunt with one another and oppositely poled, the first diode being controlled by signals from the gating signal generating means; and there being further provided means for gating the second diode to conduction during those half-waves of AC source power that the first diode is non-conductive, said further gating means including a series circuit of a diode and capacitor shunted across the load, said diode being poled the same as the first gated diode, and means interconnecting the common point of the capacitor and diode and the gate of the second gated diode.

References Cited

UNITED STATES PATENTS

| | | | |
|---|---|---|---|
| 3,243,689 | 3/1966 | Perrins | 323—22 |
| 3,331,015 | 7/1967 | Johnston | 323—22 |
| 3,332,008 | 7/1967 | Mueller et al. | 323—22 |
| 3,050,611 | 8/1962 | Kamide | 219—501 |
| 2,097,314 | 7/1963 | Harriman | 219—501 X |
| 3,240,948 | 3/1966 | Burley | 219—501 |

JOHN F. COUCH, *Primary Examiner.*

WARREN E. RAY, *Examiner.*